United States Patent
Rossetti et al.

(10) Patent No.: US 12,328,263 B2
(45) Date of Patent: Jun. 10, 2025

(54) SYSTEMS AND METHODS FOR COOPERATIVE RADIO FUNCTION FOR MULTIPLE CORE NETWORKS

(71) Applicant: Verizon Patent and Licensing Inc., Basking Ridge, NJ (US)

(72) Inventors: David Albert Rossetti, Randolph, NJ (US); Anand J. Shah, Parsippany, NJ (US); Madhusudan Mandyam Bheemarayan, Hillsborough, NJ (US); Sylvestre Demonget, Millburn, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 350 days.

(21) Appl. No.: 17/930,758

(22) Filed: Sep. 9, 2022

(65) Prior Publication Data

US 2024/0089208 A1 Mar. 14, 2024

(51) Int. Cl.
*G06F 15/177* (2006.01)
*H04L 45/42* (2022.01)
*H04L 45/44* (2022.01)
*H04L 47/24* (2022.01)

(52) U.S. Cl.
CPC .............. *H04L 47/24* (2013.01); *H04L 45/42* (2013.01); *H04L 45/44* (2013.01)

(58) Field of Classification Search
None
See application file for complete search history.

(56) References Cited

U.S. PATENT DOCUMENTS

| | | | |
|---|---|---|---|
| 2020/0351931 A1* | 11/2020 | Babaei | H04W 52/365 |
| 2022/0210844 A1* | 6/2022 | MolavianJazi | H04W 74/0841 |
| 2023/0156858 A1* | 5/2023 | Freda | H04W 52/0216 370/329 |
| 2023/0318696 A1* | 10/2023 | Sahraei | H04W 72/29 455/11.1 |
| 2023/0354192 A1* | 11/2023 | Abedini | H04W 52/0216 |
| 2023/0362904 A1* | 11/2023 | Abotabl | H04L 5/0007 |
| 2023/0397262 A1* | 12/2023 | Zhang | H04L 5/1461 |

* cited by examiner

*Primary Examiner* — Phuoc H Nguyen

(57) ABSTRACT

A system described herein may provide for an interface, such as a midhaul interface, between one or more radio elements of a radio access network ("RAN"), such as a Distributed Unit ("DU") and/or a radio unit ("RU"), and higher layer functions of the RAN, such a Central Unit ("CU"). The interface may provide for the DU to be communicatively coupled to multiple CUs, which may be associated with multiple distinct core networks. The system may route uplink traffic, received from User Equipment ("UEs") via the RU and the DU, to an appropriate CU. The system may resolve conflicting instructions, for the DU, received from different CUs. The resolution may be performed based on relative priority levels of the CUs or other factors. The system may provide for granular monitoring of traffic parameters on a per-CU basis, thus preserving the privacy of different core networks.

20 Claims, 12 Drawing Sheets

SYSTEMS AND METHODS FOR COOPERATIVE RADIO FUNCTION FOR MULTIPLE CORE NETWORKS

BACKGROUND

Wireless network providers may offer services such as wireless communication services, routing services, traffic processing services, or the like to User Equipment ("UEs") such as mobile telephones, Internet of Things ("IoT") devices, etc. Wireless network infrastructure such as radios, antennas, etc. may be deployed in geographical locations such that UEs are able to wirelessly communicate with such wireless network infrastructure and obtain wireless connectivity. Such UEs may, for example, send or receive traffic from a core network that is communicatively coupled to the wireless network infrastructure.

DETAILED DESCRIPTION OF EXAMPLE EMBODIMENTS

The following detailed description refers to the accompanying drawings. The same reference numbers in different drawings may identify the same or similar elements.

Wireless networks may be implemented or provided by multiple different entities, such as different wireless network service providers, wireless network infrastructure providers, etc. In some situations, the same set of wireless network infrastructure (e.g., base stations, radios, antennas, etc.) may be shared among different wireless network providers, which are each associated with their own separate core networks or other devices or systems. As such, elements that provide some functionality of a RAN (e.g., lower layer functions, such as radio units ("RUs") and/or distributed units ("DUs")) may be shared among different network providers, while elements that provide other functionality of a RAN (e.g., higher layer functions and/or interfaces between the RAN and a respective core network, such as CUs) may not be shared among different network providers. For example, different network providers may wish to utilize their own choice or implementation of CUs and/or other devices or systems, while still retaining the ability to share hardware resources and/or lower layer RAN functionality (e.g., RUs and/or DUs) with other network providers. Additionally, an operator or provider of the RUs, DUs, and/or other lower layer RAN functions may wish to have the flexibility to communicate with CUs and/or other devices or systems of different network providers, without the need to specifically configure DUs to communicate with different CUs using protocols, interfaces, etc. that are proprietary or otherwise unique to the different CUs.

Figure 1:
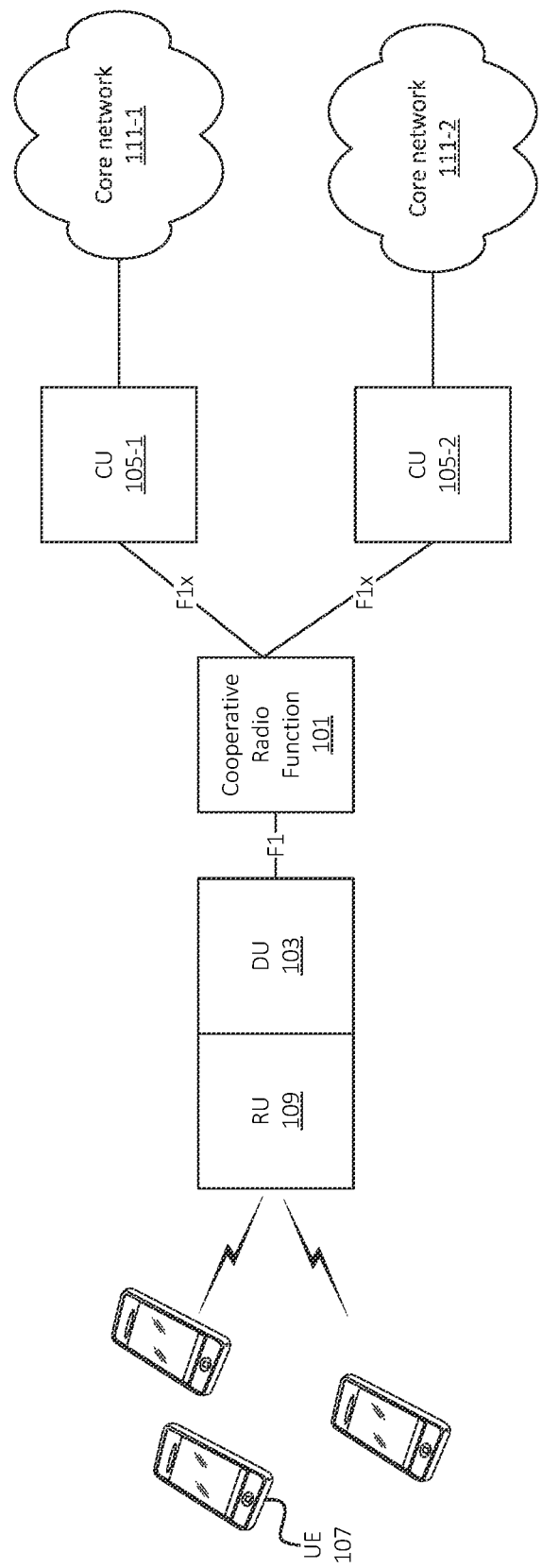
FIG. 1 illustrates an example overview of one or more embodiments described herein.

Described herein is a Cooperative Radio Function ("CRF") in accordance with some embodiments, which may serve as an interface between shared RAN resources (e.g., RUs and/or DUs) and unshared resources (e.g., CUs), which may be owned, operated, etc. by distinct entities. As shown in FIG. 1, for example, CRF 101 may simulate, provide, etc. an F1 interface between a particular DU 103 and multiple CUs 105 (i.e., CUs 105-1 and 105-2, in this example). As such, CRF 101 may be part of, may implement, and/or may otherwise be associated with a midhaul interface between radio elements of a RAN (e.g., a baseband unit ("BBU") or other hardware radio resources that may include DU 103 and/or one or more RUs 109, or other radio elements) and multiple CUs 105. In this sense, CRF 101 may provide an enhanced midhaul interface between DU 103 and one or more CUs 105.

In some embodiments, the interface between DU 103 and CRF 101 may be an unmodified F1 interface. For example, DU 103 may not be "aware" that DU 103 communicates with CRF 101 via the F1 interface as opposed to a respective CU 105. That is, from the standpoint of DU 103, CRF 101 may "appear" to be, may simulate, may act as, etc. a particular CU 105. For example, communications between DU 103 and CRF 101 may conform standards specified for an F1 interface or other suitable midhaul interface that would otherwise be present between DU 103 and CU 105. In this sense, CRF 101 may be a "plug and play" system with respect to a DU 103 that is actively deployed. In some embodiments, DU 103 and CRF 101 may be implemented by the same set of hardware resources, the same cloud computing system, etc. In some embodiments, some or all of the functionality described herein with respect to CRF 101 may be performed by DU 103. In some embodiments, CRF 101 and DU 103 may be implemented by distinct devices or systems and may communicate via one or more networks or other suitable communication interfaces.

In some embodiments, the interface between CUs 105 and CRF 101 may have additional functionality as compared an F1 interface (represented in FIG. 1 as an "F1x" interface). As discussed below, the F1x interface may include some or all of the functions, protocols, etc. as the F1 interface (e.g., for messages between CUs 105 and DU 103), and additional functions, protocols, etc. for communications between CUs 105 and CRF 101. In this manner, in some embodiments, one or more CUs 105 may be "aware" that CRF 101 is acting as an interface between such CUs 105 and DU 103. As discussed below, functionality of CRF 101 may include routing traffic from UEs 107 (e.g., via RU 109) to the appropriate CU 105 (and, accordingly, the appropriate core network 111) with which the UEs 107 are associated. CRF 101 may additionally, or alternatively, forward RAN configuration instructions to DU 103 and/or RU 109, as provided by CUs 105. In some embodiments, CRF 101 may perform or facilitate conflict resolution, negotiation, etc. in the event that conflicting RAN configuration instructions are received from different CUs 105. Further, in some embodiments, CRF 101 may provide for granular traffic monitoring, such that each core network 111 may receive traffic metrics associated with traffic, sent or received by RU 109, that is associated with that core network 111 without receiving traffic metrics associated with other core networks 111. In this manner, privacy of core networks 111 may be maintained, while still providing a full set of traffic metrics that are relevant to particular core networks 111. "Traffic," as referred to herein, may include user plane data, application traffic, control signaling, and/or other data sent to or received from respective UEs 107 via one or more RUs 109.

Figure 2:
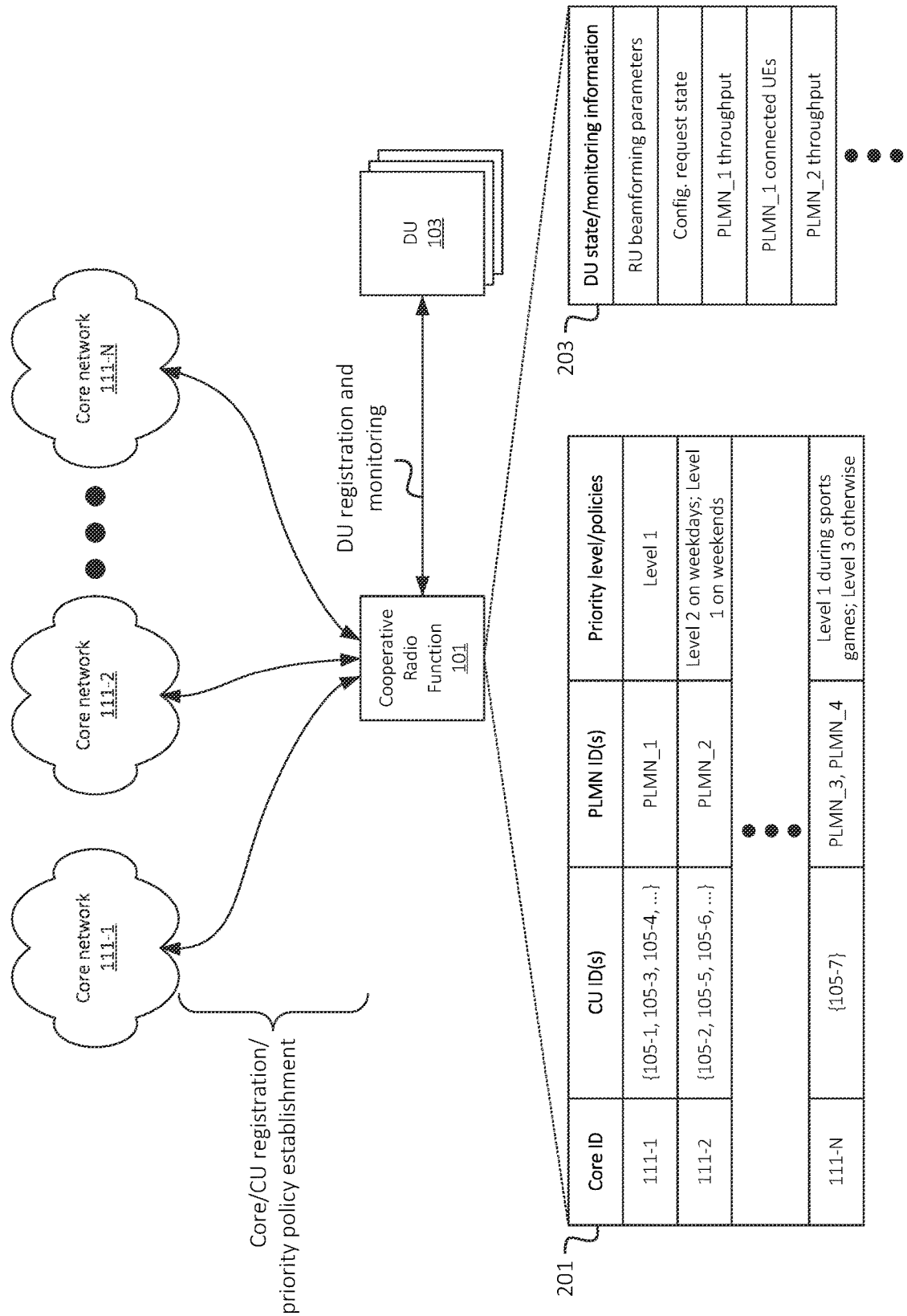
FIG. 2 illustrates an example registration of multiple core networks with a Cooperative Radio Function ("CRF") of some embodiments.

As shown in FIG. 2, one or more core networks 111 may register with CRF 101. As discussed below, the registration may include an indication of particular CUs 105 that are associated with respective core networks 111. For example, CRF 101 may include, implement, may be communicatively coupled to, etc. a user interface, a portal, an application programming interface ("API"), etc., via which one or more operators, orchestration systems, etc. associated with respective core networks 111 may register with CRF 101. In some embodiments, core networks 111 may register with CRF 101 via an F1-AP interface and/or an F1-U interface, and/or interfaces that are based on F1-AP interface and/or an F1-U interface (e.g., modified or enhanced versions of an F1-AP interface and/or an F1-U interface). CRF 101 may receive information from respective core networks 111 as part of the registration procedure, and may maintain such information in data structure 201 or in some other suitable manner. In some embodiments, data structure 201 may include additional or different information, and/or the information stored therein may be maintained by CRF 101 in some other suitable manner. For example, in some embodiments, CRF 101 may maintain data structure 201 in a local storage. In some embodiments, CRF 101 may communicate with a cloud storage system, one or more remote devices, etc. that store data structure 201 and/or other suitable information.

The registration of core networks 111 may include providing CRF 101 with information identifying respective CUs 105 that are associated with respective core networks 111. The information may include identifiers or other information based on which CRF 101 may communicate with CUs 105 of each respective core network 111. For example, core network 111-1 may provide identifiers such as Internet Protocol ("IP") addresses, device identifiers, container identifiers, etc. of CUs 105 (e.g., CUs 105-1, 105-3, and 105-4, in this example) that are associated with core network 111-1. For example, in some embodiments, CUs 105 may be implemented by virtual and/or physical hardware (e.g., servers, cloud systems, etc.) that are associated with the provided identifiers, where such identifiers may be used (e.g., by CRF 101) to communicate with such CUs 105. Such identifiers are represented in data structure 201 as "CU ID(s)" such as "{105-1, 105-3, 105-4, . . . }" for core network 111-1, "{105-2, 105-5, 105-6, . . . }" for core network 111-2, and so on.

The registration of core networks 111 may include providing identifying information for traffic that is associated with respective core networks 111. In the examples described herein, Public Land Mobile Network ("PLMN") identifiers are used as examples of such identifiers. In practice, one or more other identifiers or attributes may be used to indicate which traffic is associated with which core network 111. In some embodiments, as part of the registration procedure, core networks 111 may provide identifiers associated with UEs 107 with which respective core networks 111 are associated. For example, core network 111-1 may provide, to CRF 101, identifiers such as International Mobile Station Equipment Identity ("IMEI") values, Permanent Equipment Identifier ("PEI") values, International Mobile Subscriber Identity ("IMSI") values, Subscription Permanent Identifier ("SUPI") values, Globally Unique Temporary Identifier ("GUTI") values, Mobile Directory Numbers ("MDNs"), IP addresses, or other suitable identifiers of UEs 107 with which core network 111-1 is associated. As discussed below, CRF 101 may use such information (e.g., PLMN identifiers, UE identifiers, and/or other suitable identifiers or attributes) to identify which traffic is associated with which particular core network 111. These example identifiers are represented in data structure 201 as "PLMN ID(s)" such as "PLMN 1" for core network 111-1, "PLMN 2" for core network 111-2, and so on. In some embodiments, one core network may be associated with multiple PLMN identifiers (or other identifiers), such as core network 111-N, which is associated with example PLMN identifiers "PLMN 3" and "PLMN 4."

The registration may also include establishing priority levels, policies, etc. associated with each respective core network 111, which may be used by CRF 101 in order to resolve conflicts or otherwise process instructions received from multiple different core networks 111 (e.g., from CUs 105 associated with different core networks 111). For example, one or more core networks 111 may be associated with a static priority level, such as core network 111-1, which is associated with example priority level 1. In some embodiments, the priority policies may include conditions, criteria, dependencies, etc. based on which a given core network 111 may be associated with different priority levels at different times. For example, as shown, core network 111-2 may be associated with one priority level (e.g., level 2) on weekdays, and may be associated with a different priority level (e.g., level 1) on weekends. As yet another example, the conditions, criteria, etc. may specify events, occurrences, etc. based on which the priority level of a given core network 111 may vary. For example, core network 111-N may be associated with priority level 1 during sports games (e.g., based on times at which sports games are scheduled, times that CRF 101 and/or some other device or system uses artificial intelligence/machine learning ("AI/ML") techniques or other modeling techniques to predict the occurrence of sports games, etc.), and priority level 3 during other times. While simplified examples of priority policies are provided above, in practice, priority policies may be relatively complex, and/or may be expressed in terms other than priority levels.

Further, in some embodiments, the same core network 111 may be associated with different priority policies for different DUs 103, geographical locations, or other criteria. For example, a first DU 103 may be associated with a geographical location that is proximate to (e.g., within a threshold distance of) a sports arena, while a second DU 103 may not be proximate to a sports arena. As such, policies that refer to sports games may not necessarily be relevant for the second DU 103. In practice, other situations may arise in which different priority policies for different DUs 103, geographical locations, etc. may be desirable.

Figure 3:
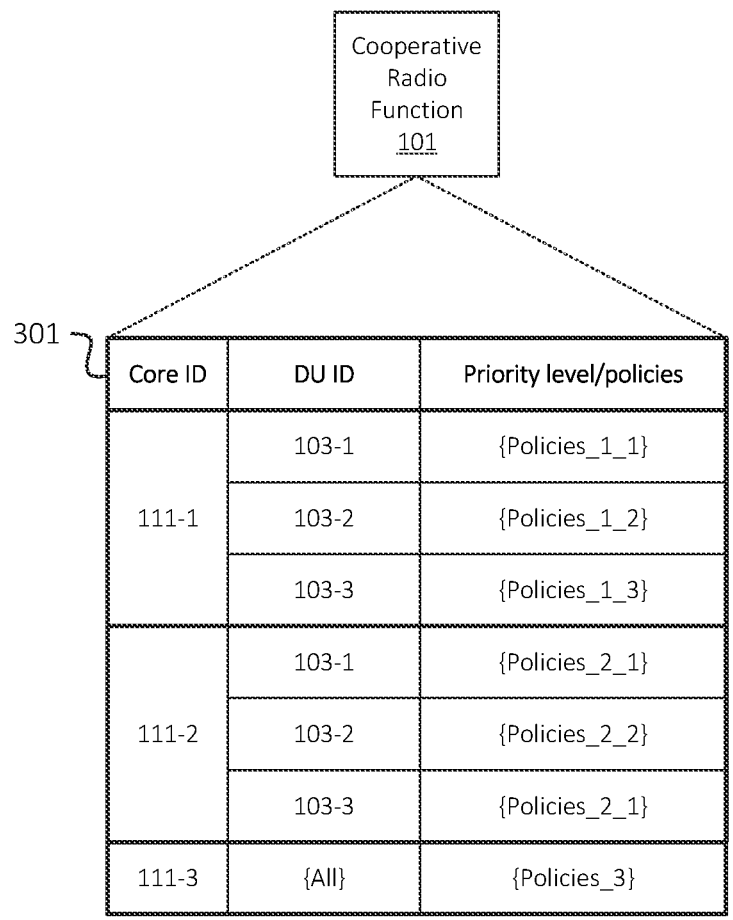
FIG. 3 illustrates an example of priority policies associated with multiple core networks and multiple Distributed Units ("DUs"), in accordance with some embodiments.

As such, as shown in FIG. 3, CRF 101 may maintain and/or otherwise access data structure 301, which includes priority policies associated with one or more core networks 111 and multiple DUs 103. In practice, different priority policies for a given core network 111 may be associated with other criteria in addition to, or in lieu of, DUs 103 (e.g., geographical location or other criteria). As shown, for example, core network 111-1 may be associated with a first set of priority policies (shown as "{Policies_1_1}" for a first DU 103-1, a second set of priority policies (shown as "{Policies_1_2}" for a second DU 103-2, and a third set of priority policies (shown as "{Policies_1_3}" for a third DU 103-3. As also shown, core network 111-2 may be associated with a first set of priority policies (shown as "{Policies_2_1}" for DUs 103-1 and 103-3, and a second set of priority policies (shown as "{Policies_2_2}" for DU 103-2. Thus, different core networks 111 may be associated with different priority policies for the same DU 103, and one particular core network 111 may be associated with different priority policies for different DUs 103. In some instances, one particular core network 111 may be associated with the same priority policy for different DUs 103. For example, core network 111-3 may be associated with the same set of priority policies (shown as "{Policies_3}") for multiple or all DUs 103 that are registered with CRF 101.

Returning to FIG. 2, and as mentioned above, one or more DUs 103 may be registered with CRF 101. For example, a network provider, operator, etc. may provide identifying information or other information that CRF 101 may use to communicate with DUs 103, such as IP addresses, DU identifiers, etc. Similarly, such network provider, operator, etc. may provide identifying information of CRF 101 or other information that DUs 103 may use to communicate with CRF 101 to DUs 103. In some embodiments, the registration or configuration of a given DU 103 with CRF 101 may, from the standpoint of DU 103, be the same as a registration or configuration procedure whereby DU 103 is associated, registered, etc. with a given CU 105. For example, an F1 interface associated with DU 103 may be used to communicate with CRF 101.

In some embodiments, CRF 101 may maintain data structure 203, which may include state information, monitoring information, or other information associated with DU 103. For example, a particular instance of data structure 203 may be associated with a particular DU 103. In some embodiments, some information stored in data structure 203 may be received from, or derived from information received from, DU 103. In some embodiments some information stored in data structure 203 may be not be received from, or derived from information received from, DU 103. As such, data structure 203 may include information received from DU 103, as well as information that is not received from DU 103.

For example, DU 103 may provide, during the course of operation, metrics, configuration parameters, or other information associated with DU 103 and/or a respective RU 109 to which DU 103 is communicatively coupled. For example, a given DU 103 may provide (e.g., via an F1 interface) performance metrics (e.g., throughput, latency, activity rate, and/or other performance metrics), load metrics (e.g., quantity of UEs connected to an RU 109 with which DU 103 is associated, amount of utilized and/or available radio frequency ("RF") resources associated with an RU 109 with which DU 103 is associated, etc.), and/or other types of information associated with DU 103. In some embodiments, such metrics may be provided on the basis of PLMN identifier or other identifying information based on which CRF 101 may use to identify a respective core network 111 with which such metrics are associated. In this manner, CRF 101 may be able to identify per-core network metrics associated with DU 103 and one or more associated RUs 109, even though DU 103 may process (e.g., perform lower layer processing such as error correction, packet reconstruction, etc.) traffic associated with multiple core networks 111 as sent or received via associated RU(s) 109.

Data structure 203 may further store configuration parameters associated with RU(s) 109 with which DU 103 is associated, such as beamforming parameters (e.g., azimuth angle, beam width, transmit power, etc.) associated with RU 109, queue weight information or other Quality of Service ("QoS") parameters associated with DU 103, etc. In some embodiments, DU 103 may provide such information to CRF 101. Additionally, or alternatively, CRF 101 may maintain such information without receiving the information from DU 103. In some embodiments, CRF 101 may provide configuration instructions or parameters to DU 103, and may maintain state information in data structure 203 based on the provided instructions or parameters. For example, if CRF 101 instructs DU 103 to implement a first set of beamforming parameters (e.g., a particular azimuth angle, beam width, etc.), CRF 101 may maintain, in data structure 203, the first set of beamforming parameters as the beamforming parameters associated with DU 103. In some embodiments, CRF 101 may maintain such information without receiving feedback or confirmation from DU 103 (e.g., CRF 101 may "assume" that the instructions were implemented). In some embodiments, on the other hand, CRF 101 may maintain such information only after receiving feedback, confirmation, acknowledgment, etc. from DU 103 that the instructions were implemented.

CRF 101 may also maintain a configuration request state, which may include a queue, stack, etc. of DU or RU configuration requests received from one or more core networks 111 (e.g., from respective CUs 105 associated with such core networks 111). As discussed below, the configuration request state may be used by CRF 101 to perform conflict resolution, negotiation, etc. in instances where different, potentially conflicting configuration instructions are received from different CUs 105.

Figure 4:
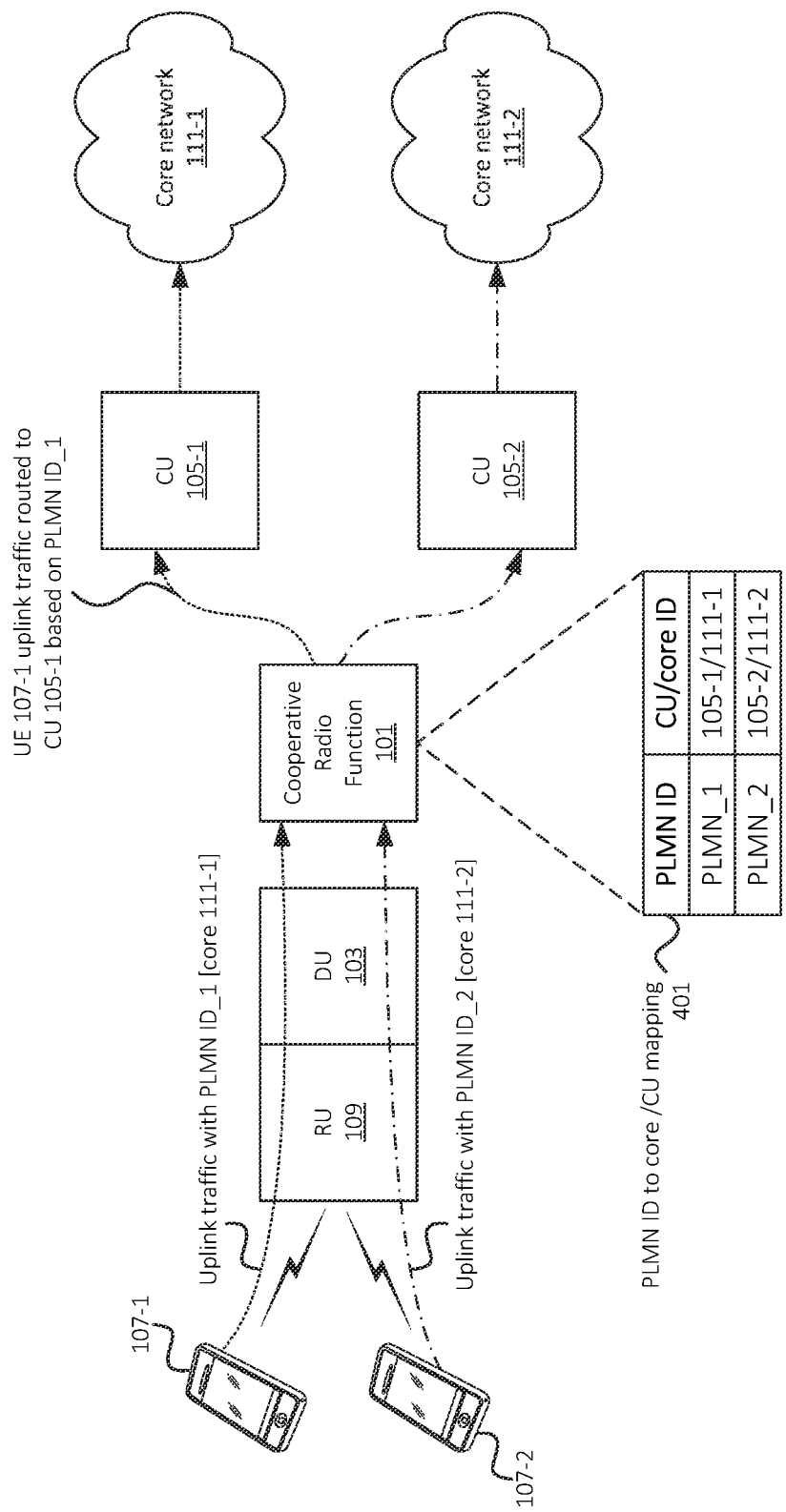
FIG. 4 illustrates an example of routing uplink traffic to an appropriate Central Unit ("CU") and/or core network, in accordance with some embodiments.

As noted above, and as shown in FIG. 4, CRF 101 may route traffic (e.g., uplink traffic) to an appropriate CU 105 (and accordingly, to an appropriate core network 111). For example, assume that UE 107-1 is associated with core network 111-1, and that UE 107-2 is associated with core network 111-2. As further shown, CRF 101 may maintain or otherwise access data structure 401, which includes a mapping between PLMN identifiers and core networks 111 and/or CUs 105. Data structure 401 may represent a portion of data structure 201, may be derived from data structure 201, and/or may be a separate data structure stored by CRF 101. In this example, data structure 401 reflects that a first PLMN identifier ("PLMN_1") is associated with CU 105-1 and/or core network 111-1, and that a second PLMN identifier ("PLMN_2") is associated with CU 105-2 and/or core network 111-2. In some embodiments, PLMN identifiers (or other suitable network identifiers reflected in data structure 201) may uniquely identify a particular core network 111 and/or set of CUs 105. That is, in some embodiments, PLMN identifiers or other suitable identifiers may be used as a primary key, a unique identifier, an unambiguous identifier, etc. of a particular core network 111 and/or set of CUs 105, such that the same PLMN identifier does not refer to multiple different core networks 111 (e.g., or multiple sets of CUs 105 that are associated with different core networks 111).

As further shown, CRF 101 may receive (e.g., via RU 109 and DU 103, via an F1 interface or other suitable interface) uplink traffic from UEs 107-1 and 107-2. In some embodiments, the uplink traffic may be sent by DU 103 as Radio Link Control ("RLC") packets or in some other suitable format. In some embodiments, the uplink traffic may include a PLMN identifier or other identifier associated with a particular core network 111. Additionally, or alternatively, the traffic may include one or more flow identifiers, based on which CRF 101 may identify core network 111. For example, CRF 101 may maintain information associating particular flow identifiers, UEs 107, etc. with PLMN identifiers or other information associated with particular core networks 111.

In this example, CRF 101 may identify that uplink traffic from UE 107-1 is associated with core network 111-1 (and accordingly should be provided to CU 105-1), and may identify that uplink traffic from UE 107-2 is associated with core network 111-2, and should accordingly be provided to CU 105-2. CUs 105-1 and 105-2 may perform higher layer processing on the received uplink traffic, and may forward the processed traffic to core networks 111-1 and 111-2, respectively. The higher layer processing performed by a particular CU 105 may include, for example, forming Packet Data Convergence Protocol ("PDCP") packets based on received RLC packets (e.g., using a concatenation operation or other suitable processing), identifying endpoints for one or more GPRS Tunneling Protocol ("GTP") tunnels between CU 105 and core network 111 (e.g., a User Plane Function ("UPF") or other device or system of core network 111 to which the traffic should be forwarded), and/or other suitable processing. In this manner, CRF 101 may effectively route uplink traffic to its appropriate destination (e.g., a respective CU 105 and, ultimately, core network 111).

Figure 5:
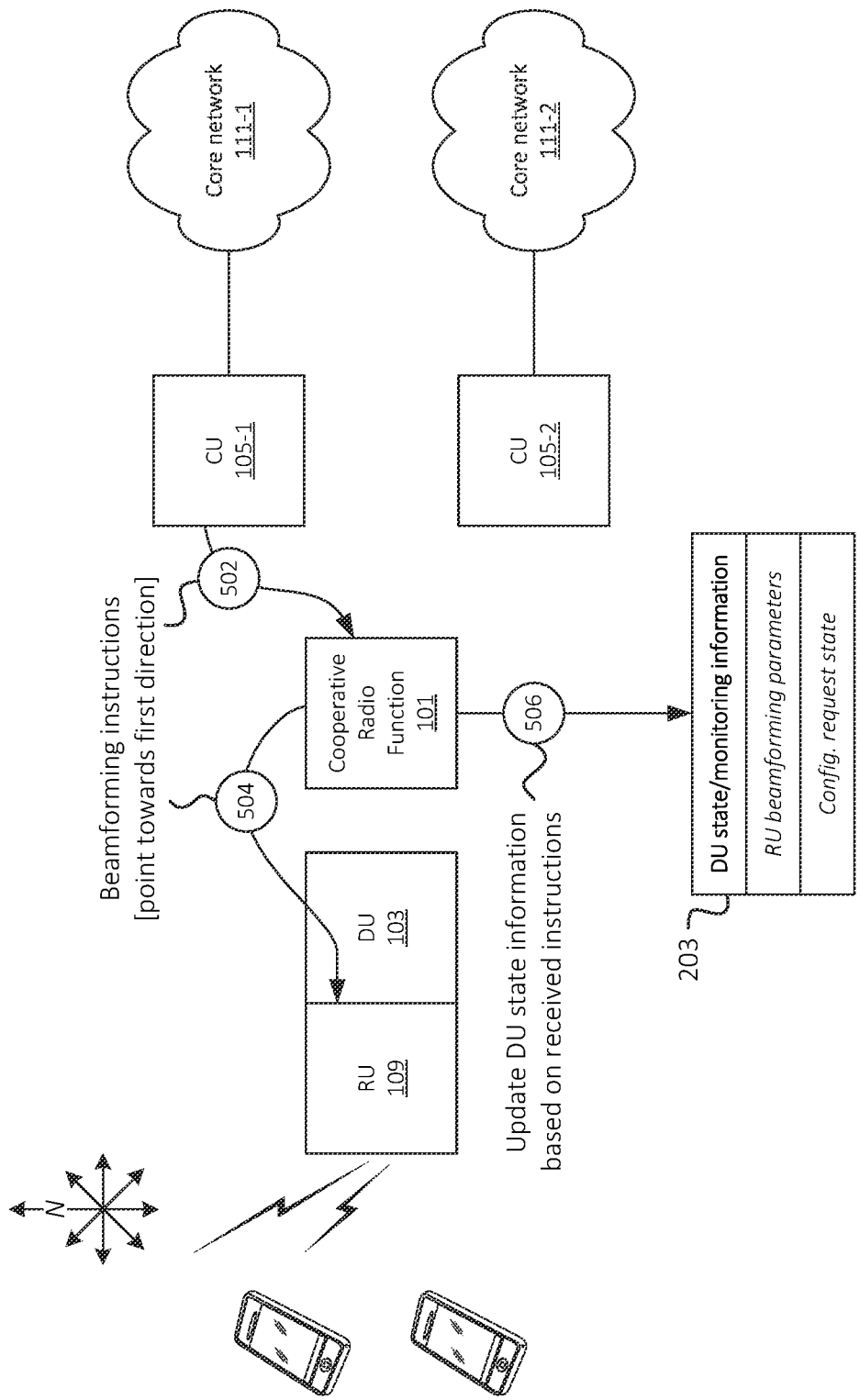
FIGS. 5-7 illustrate examples of resolution for conflicting instructions received from multiple Central Units ("CUs") via the enhanced midhaul interface, in accordance with some embodiments.

As noted above, and as shown in FIGS. 5-7, CRF 101 may perform conflict resolution, negotiation, etc. when receiving configuration parameters from multiple CUs 105. For example, as shown in FIG. 5, CRF 101 may maintain a configuration request state indicating configuration instructions provided by respective CUs 105, such as in data structure 203 (e.g., where a portion of data structure 203 is shown in FIG. 5). As shown, CRF 101 may receive (at 502) beamforming instructions from CU 105-1. The instructions may include, for example, instructions for RU 109, with which DU 103 is associated, to point in a first direction (e.g., in a northwest direction). The instructions may include other instructions in addition to, or in lieu of, a direction or azimuth angle, such as other beamforming parameters (e.g., beam width, transmit power, etc.) or other types of configuration instructions.

In this example, CRF 101 may determine that the received (at 502) instructions do not conflict with previously provided instructions (e.g., as reflected in the configuration request state of data structure 203). For example, CRF 101 may determine that CU 105-1 has higher priority than other CUs 105 from which CRF 101 has previously received instructions, that CRF 101 has not received any instructions from other CUs 105, and/or that the instructions from CU 105-1 should otherwise be implemented. CRF 101 may accordingly provide (at 504) the beamforming instructions to DU 103, which may forward such instructions to RU 109 and/or may otherwise cause RU 109 to implement the instructions.

CRF 101 may update (at 506) the DU state information, which may be stored in data structure 203, as discussed above. For example, CRF 101 may update information indicating configuration parameters of DU 103 and/or RU 109 (e.g., RU beamforming parameters) and/or may update information of the configuration request state, indicating that the configuration of DU 103 and/or RU 109 is based on instructions provided (at 502) by CU 105-1. As noted above, CRF 101 may update (at 506) some or all of such information in data structure 203 based on receiving an acknowledgment, confirmation, etc. from DU 103. On the other hand, in some embodiments, CRF 101 may update (at 506) some or all of such information in data structure 203 without receiving such acknowledgment, confirmation, etc. from DU 103, or otherwise independently of receiving any such acknowledgment, confirmation, etc.

Figure 6:
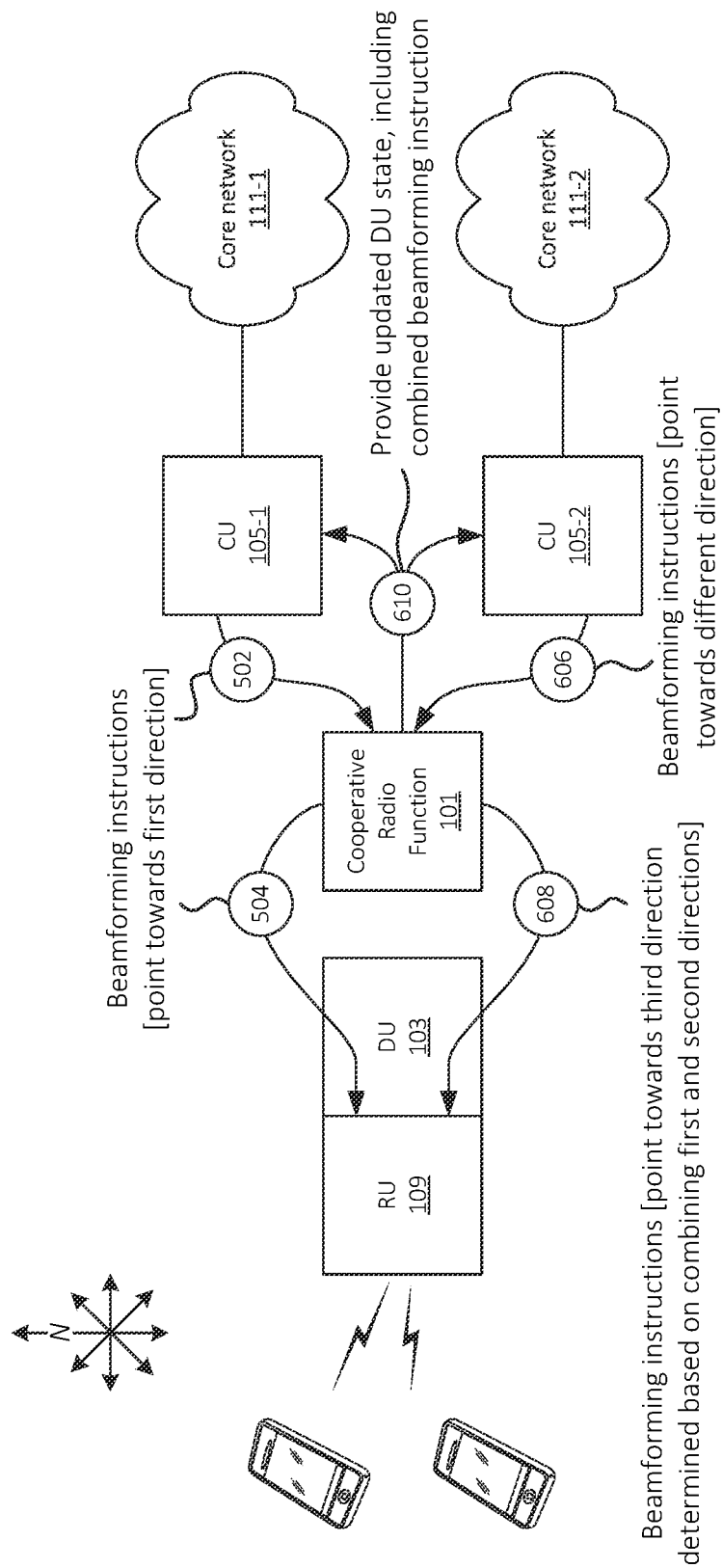
Figure 7:
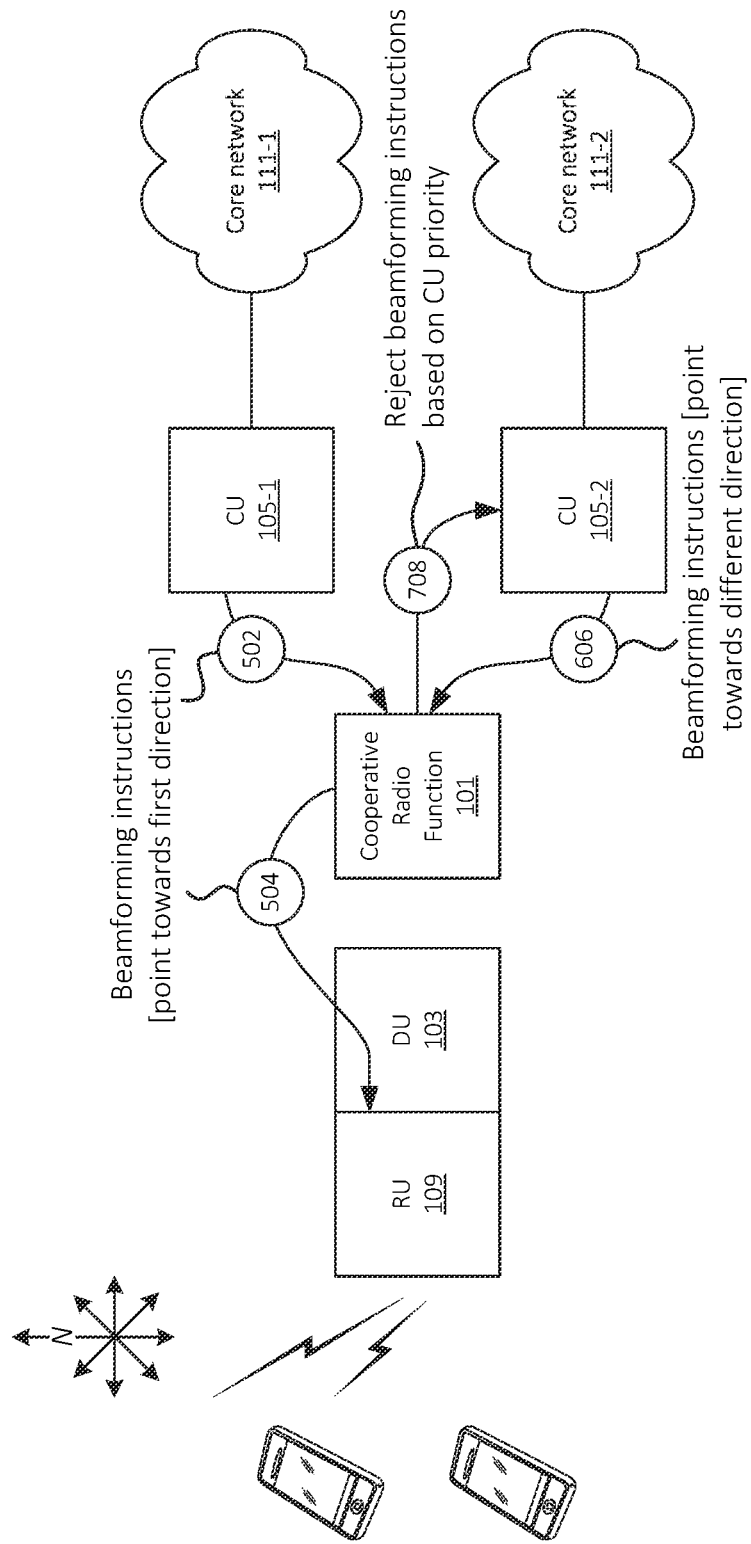

FIGS. 6 and 7 illustrate example situations in which CRF 101 receives conflicting instructions from CU 105-2, and ways in which CRF 101 may resolve such conflicting instructions. For example, as shown in FIG. 6, after instructing (at 504) DU 103 to implement instructions provided by CU 105-1, CRF 101 may receive (at 606) beamforming instructions from CU 105-2, instructing DU 103 to point one or more antennas associated with RU 109 in a different direction than the direction previously instructed by CU 105-1.

CRF 101 may determine that the instructions received (at 606) from CU 105-2 conflict with the previously received (at 502) instructions from CU 105-1. For example, CRF 101 may determine that one or more variables, parameters, etc. are the same in both sets of instructions, but have different values. For example, both sets of instructions may include a specified azimuth angle for one or more antennas, and CRF 101 may determine that the specified angle in both sets of instructions is different. Additionally, or alternatively, CRF 101 may simulate the implementation of the second set of instructions, and may determine that implementing the second set of instructions may result in the first set of instructions no longer being implemented. In some embodiments, CRF 101 may identify the conflict using AI/ML techniques or in some other suitable manner.

In some embodiments, 101 may refer to the configuration request state information (e.g., as stored in data structure 203) to identify that the instructions (received at 606) conflict with the previously received (at 502) instructions. For example, the configuration request state information may indicate that CU 105-1 had previously provided beamforming instructions, which are still in effect as of the time that the second set of instructions were received (at 606) from CU 105-2.

In accordance with some embodiments, CRF 101 may resolve the conflict by combining the instructions, which may result in a "compromise" or "fair" resolution of the conflicting instructions. For example, assuming that the first set of instructions, from CU 105-1, specified a first direction (e.g., a first azimuth angle) and that the second asset of instructions, from CU 105-2, specified a second direction (e.g., a second azimuth angle), CRF 101 may select a third direction (e.g., a third azimuth angle) that is derived from or otherwise based on both the first and second directions.

For example, CRF 101 may identify a direction that is in between the first and second directions, such as a direction that is in the middle of the first and second directions. In some embodiments, the third direction may be determined in accordance with priority levels or other parameters associated with CUs 105-1 and 105-2. For example, if CU 105-1 has a relatively higher priority level, then the first direction may be more heavily weighted when determining the third direction. For example, the third direction may directed more towards the first direction than the second direction, rather than being directly in the middle of the first and second directions.

In some embodiments, CRF 101 may take one or more other factors into account in addition to, or in lieu of, priority level of respective CUs 105. For example, CRF 101 may determine (e.g., based on monitoring information received from DU 103) that a greater quantity of connected UEs are located in a coverage area associated with the first direction, than are located in a coverage area associated with the second direction. In this example, CRF 101 may more heavily weight the first direction than the second direction when determining the third direction (e.g., in addition to, or in lieu of, considering relative priority levels of CUs 105-1 and 105-2).

In some embodiments, CRF 101 may use a higher weight for more "senior" instructions. For example, since CRF 101 received (at 502) instructions from CU 105-1 before receiving (at 606) instructions from CU 105-2, CRF 101 may apply a higher weight to values included in the instructions from CU 105-1 than the values included in the instructions from CU 105-2, when generating the combined set of instructions.

CRF 101 may accordingly provide (at 608) the beamforming instructions, that were generated based on combining the conflicting sets of beamforming instructions received from CUs 105-1 and 105-2, to DU 103. DU 103 may accordingly provide, forward, etc. the instructions to RU 109, such that RU 109 may implement the instructions. For example, RU 109 may point one or more antennas toward the third direction based on receiving the instructions.

CRF 101 may additionally provide (at 610) information to CUs 105-1 and 105-2, indicating the combined instructions that were provided to DU 103. In this manner, CUs 105-1 and 105-2 may both be made aware that the respective instructions provided by CUs 105-1 and 105-2 were not implemented in full, but rather that the instructions provided by CUs 105-1 and 105-2 were factors in the instructions that were ultimately provided to DU 103. In this manner, core networks 111-1 and 111-2 associated with CUs 105-1 and 105-2 may be able to account for the different instructions, such as by performing modifications to core network elements or other suitable modifications.

In some embodiments, as shown in FIG. 7, CRF 101 may handle conflicting instructions by rejecting instructions that conflict with previously received instructions, and/or instructions that conflict with instructions provided by a CU 105 with a higher priority level. For example, as shown, assume that CRF 101 receives (at 502) beamforming instructions from CU 105-1, and provides (at 504) the beamforming instructions to DU 103 for implementation at RU 109. Further assume that CU 105-2 provides (at 606) conflicting instructions, as discussed above.

In accordance with some embodiments, CRF 101 may reject (at 708) the instructions from CU 105-2. For example, CRF 101 may determine that CU 105-2 is a lower priority level than CU 105-1, and therefore is not authorized to instruct DU 103 and/or RU 109 to implement instructions that conflict with instructions from CU 105-1. In some embodiments, CRF 101 may reject (at 708) the instructions from CU 105-2 based on one or more other factors in addition to, or in lieu of, relative priority levels of CUs 105-1 and 105-2. For example, CRF 101 may determine that the coverage area of DU 103 and/or RU 109, after the modification instructed (at 606) by CU 105-2, would reduce the quantity of UEs connected to RU 109. As another example, CRF 101 may determine that network performance (e.g., throughput, latency, etc.) would degrade (e.g., for all UEs connected to RU 109, and/or for selected UEs such as UEs belonging to a particular group, category, classification, etc.) below a threshold performance level if the modifications requested by CU 105-2 were implemented. As another example, CRF 101 may reject the instructions from CU 105-1 (with which the instructions from CU 105-2 conflict) are "senior" to the instructions received from CU 105-2. In some embodiments, CRF 101 may reject (at 708) the conflicting instructions received (at 606) from CU 105-2 based on one or more other factors.

In some embodiments, CRF 101 may provide (at 708), such as via the F1x interface, an indication to CU 105-2, indicating that the instructions provided (at 606) by CU 105-2 were not implemented. In some embodiments, CRF 101 may provide one or more reasons that the instructions were not implemented, which may refer to the above example reasons or other suitable reasons. In some embodiments, the provided reasons may include a duration of time that the instructions will conflict, or are expected to conflict. For example, the instructions (received at 502) from CU 105-1 may specify a set duration, end time, etc. Additionally, or alternatively, CRF 101 may use AI/ML techniques to predict or otherwise determine when the instructions from CU 105-1 will no longer be in effect (e.g., in situations where the instructions may be temporary, such as based on the occurrence of a sporting event, a daily commute, etc.). In this manner, CU 105-2 and/or an operator or orchestration system thereof, may be able to determine an alternate set of instructions that may not conflict with the previously received instructions from CU 105-1, and/or may be able to identify a time at which the modifications may be reattempted.

For example, in some embodiments, after receiving (at 708) the indication that the instructions were rejected, CU 105-2 may attempt to provide slightly different instructions than were initially provided by CU 105-2, in order to not conflict with the instructions provided by CU 105-1. In some embodiments, such attempts may be performed in an iterative manner, such that CU 105-2 may identify a set of instructions that matches the objectives of CU 105-2 and/or an operator thereof as closely as possible.

Figure 8:
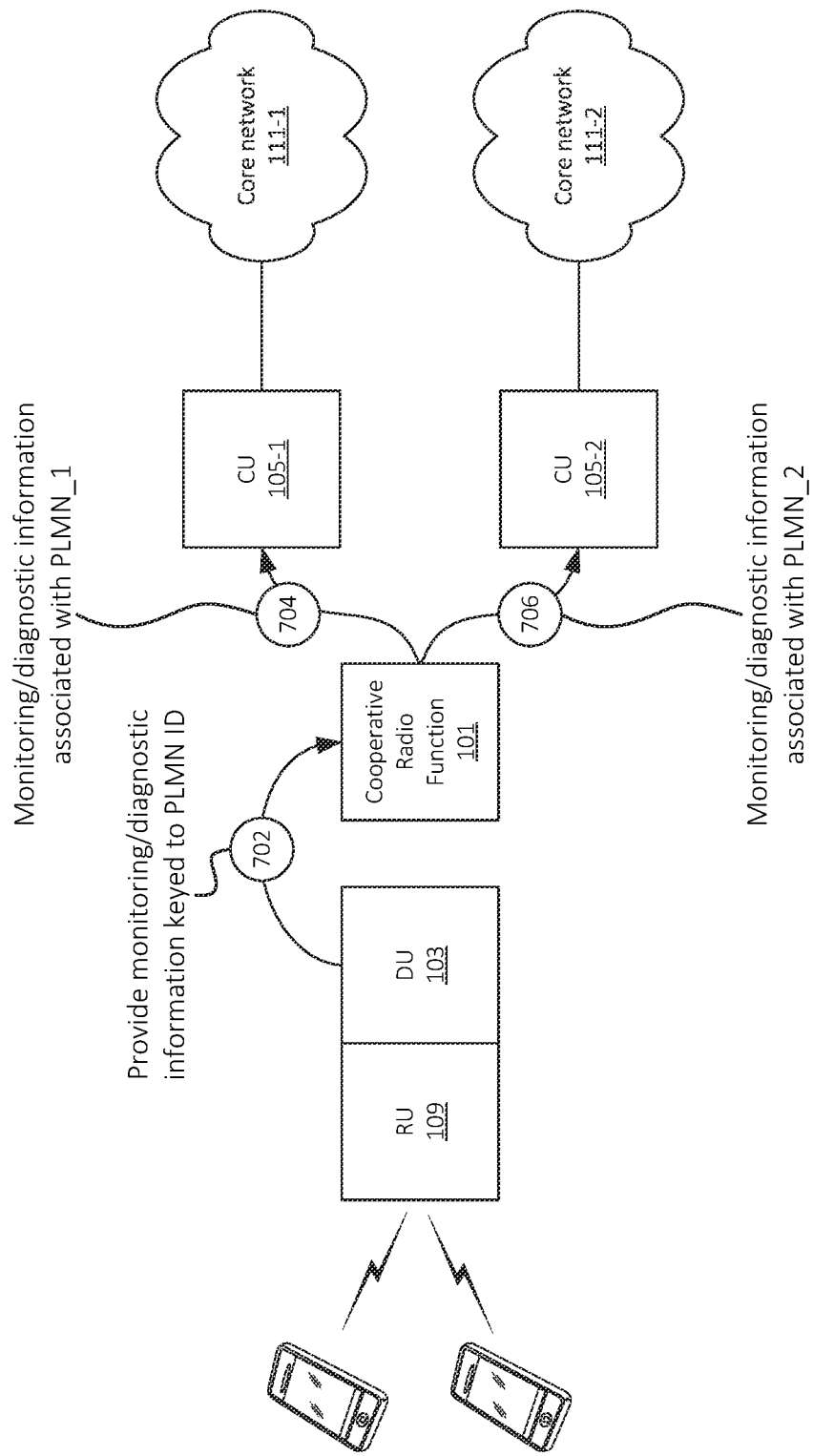
FIG. 8 illustrates an example of providing granular monitoring, measurement, tracing, and/or diagnostic information to an appropriate CU and/or core network, in accordance with some embodiments.

As discussed above, and as shown in FIG. 8, CRF 101 may provide for granular reporting of metrics, fault and diagnostic information, Key Performance Indicators ("KPIs"), etc. on the basis of traffic associated with a particular core network 111 and/or CU 105. For example, as discussed above with respect to FIG. 2, CRF 101 may receive (e.g., from one or more DUs 103 and/or other suitable devices or systems) monitoring information that includes performance metrics, load metrics, and/or other suitable metrics or KPIs. Such metrics, KPIs, etc. may be provided (at 702) by DUs 103 on the basis of PLMN identifier or other suitable identifier(s) that are distinctly associated with respective core networks 111 and/or CUs 105.

Accordingly, CRF 101 may provide (at 704) monitoring information, fault and diagnostic information, KPIs, etc. associated with PLMN identifier "PLMN_1" to CU 105-1. For example, CRF 101 may identify (e.g., based on data structure 201 and/or in some other suitable manner) that PLMN_1 is associated with CU 105-1 and/or core network 111-1. CRF 101 may accordingly "push" the information to CU 105-1, such as by providing (e.g., via the F1x interface) the information to CU 105-1 periodically, intermittently, based on the occurrence of one or more events or conditions (e.g., network load conditions, performance or QoS-related conditions, etc.) or in some other fashion. Additionally, or alternatively, CRF 101 may cache or otherwise store some or all of such information, and may provide (at 704) the information to CU 105-1 in response to one or more monitoring requests.

Similarly, CRF 101 may provide (at 706) monitoring information, fault and diagnostic information, KPIs, etc. associated with PLMN identifier "PLMN_2" to CU 105-2. In this manner, CU 105-1 may receive no monitoring information, fault and diagnostic information, KPIs, etc. associated with CU 105-2 or core network 111-2, while CU 105-2 may receive no monitoring information, fault and diagnostic information, KPIs, etc. associated with CU 105-1 or core network 111-1. In this manner, a given CU 105 and/or core network 111 may receive monitoring and/or fault and diagnostic information, relating to wireless communications associated with UEs that are associated with the given CU 105 and/or core network 111, without sharing such information with other CUs 105 and/or core networks 111 that share hardware radio resources such as RU 109 and/or DU 103.

Figure 9:
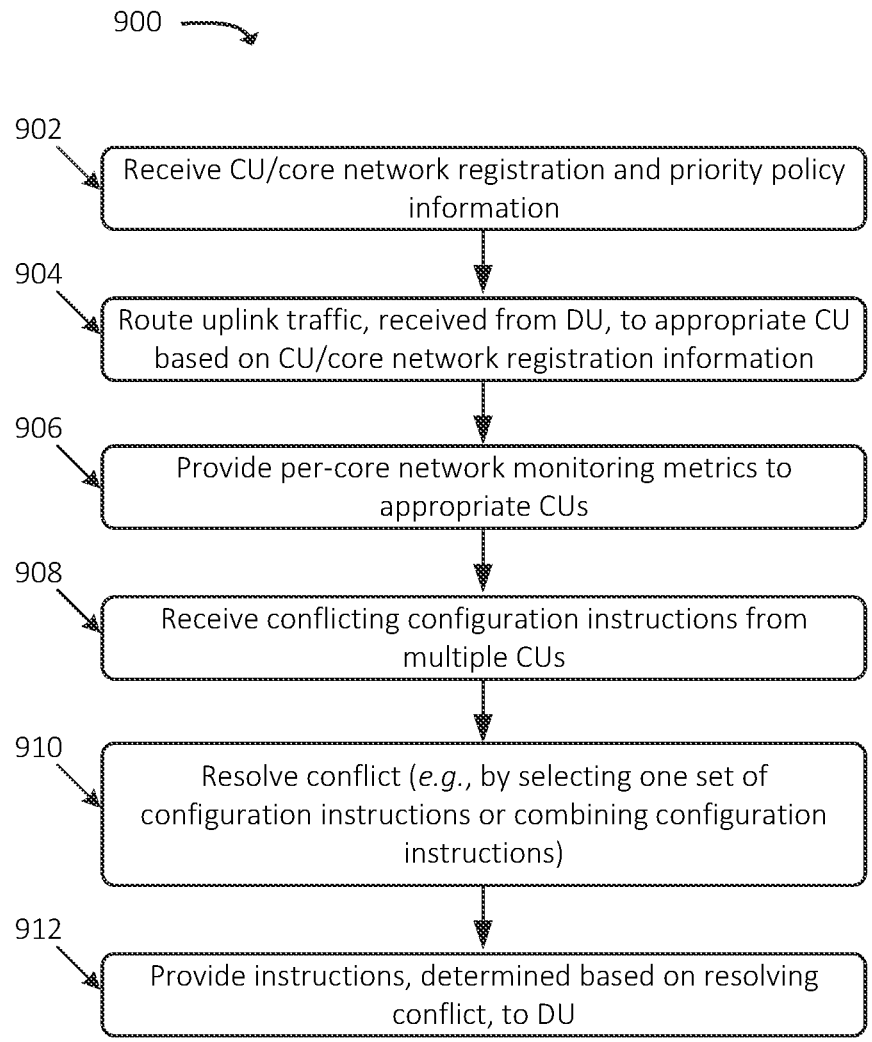
FIG. 9 illustrates an example process for providing an enhanced midhaul interface, in accordance with some embodiments.

FIG. 9 illustrates an example process 900 for providing an enhanced midhaul interface (e.g., between DU 103 and multiple CUs 105). In some embodiments, some or all of process 900 may be performed by CRF 101. In some embodiments, one or more other devices may perform some or all of process 900 in concert with, and/or in lieu of, CRF 101.

As shown, process 900 may include receiving (at 902) CU and/or core network registration and priority policy information. For example, as discussed above, CRF 101 may receive such registration information from one or more CUs 105 that are associated with one or more core networks 111, and/or from some other suitable source. For example, CRF 101 may implement an API, user interface, or other suitable communication pathway via which such information may be registered with CRF 101. The registration information may include PLMN identifiers or other suitable identifiers based on which traffic, associated with respective CUs 105 and/or core networks 111, may be identified by CRF 101.

The priority policies may, as discussed above, include a priority level or other suitable information associated with respective CUs 105 and/or core networks 111. In some embodiments, the priority policies may include conditions, criteria, etc. based on which respective CUs 105 and/or core networks 111 may be associated with different priority levels at different times and/or based on the satisfaction of such conditions, criteria, etc. As also discussed above, CRF 101 and one or more DUs 103 may be configured to communicate with each other, which may include DU 103 receiving an IP address or other suitable information that DU 103 may use to communicate with CRF 101. In some embodiments, as discussed above, CRF 101 may implement an F1 interface or other suitable midhaul interface with respect to communications between CRF 101 and DU 103, in order to maintain compatibility with DUs 103 that communicate via such interfaces. In some embodiments, as discussed above, CRF 101 may be communicatively coupled to multiple DUs 103, and respective priority information for particular DUs 105 and/or core networks 111 may be different for different DUs 103.

Process 900 may further include routing (at 904) uplink traffic, received from DU 103, to an appropriate CU 105 based on the CU and/or core network registration information. For example, CRF 101 may receive, via an F1 interface or other suitable midhaul interface between CRF 101 and DU 103, uplink traffic received by DU 103. As noted above, the traffic may include user plane traffic (e.g., application traffic such as voice traffic, content streaming traffic, etc.) and/or control plane signaling. For example, DU 103 may receive the traffic from a respective RU 109 that is communicatively coupled to DU 103, where such uplink traffic may have been provided by one or more UEs 107 via wireless communications between UEs 107 and RU 109. The received traffic may be received by CRF 101 from DU 103 as RLC packets or in some other suitable form. In some embodiments, the received traffic may include PLMN identifiers or other suitable identifiers based on which CRF 101 may identify which CU 105 the traffic should be routed to. For example, CRF 101 may identify, based on the registration information, that the traffic is associated with a particular CU 105 or core network 111, and may provide the traffic to the particular CU 105 associated with core network 111.

Process 900 may additionally include providing (at 906) per-core network monitoring metrics to appropriate CUs 105. For example, as discussed above, CRF 101 may receive network monitoring information (e.g., based on one or more requests, and/or based on such information being "pushed") from DU 103. DU 103 may, for example, provide such information with PLMN identifiers or other identifiers associated with particular CUs 105 and/or core networks 111, and CRF 101 may provide such information to the particular CUs 105 with which the PLMN identifiers or identifiers are associated. In this manner, privacy of traffic metrics associated with different core networks 111 may be preserved, in comparison with implementations in which CUs 105 are directly communicatively coupled to DU 103 and accordingly would receive all traffic metrics determined by DU 103, including traffic metrics for other core networks 111.

Process 900 may also include receiving (at 908) conflicting configuration instructions from multiple CUs 105. For example, CRF 101 may receive beamforming instructions or other instructions from multiple CUs 105 that conflict with each other. The description above (e.g., with respect to FIGS. 5-7) provides examples of how CRF 101 may detect the conflict. In general, the implementation of a first set of instructions provided by a first CU 105 may conflict with a second set of instructions provided by a second CU 105, in that implementing the first set of instructions may cause the second set of instructions to not be fully implemented, or vice versa.

Process 900 may further include resolving (at 910) the conflict. For example, as discussed above, CRF 101 may reject one of the sets of instructions, which may include selecting one set of instructions to implement in full, while rejecting the other set of instructions in full. Such selection or rejection may be based on relative priority levels of CUs 105 and/or associated core networks 111, and/or based on other factors, as discussed above. In some embodiments, CRF 101 may output a confirmation to a respective CU 105 that instructions from such CU 105 have been implemented, and/or may output a notification to a respective CU 105 that instructions from such CU 105 have not been implemented. In this manner, such CU 105 may have the opportunity to reattempt the providing of configuration instructions that may potentially be implemented.

As another example, CRF 101 may generate a combined set of instructions, which may include combining one or more values from each of the first set of instructions and the second set of instructions. In some embodiments, generating the combined set of instructions may include applying one or more weights to the values included in the first and/or second sets of instructions. The weights may be based on relative priority levels of CUs 105 and/or associated core networks 111, and/or based on other factors, as discussed above.

Process 900 may additionally include providing (at 912) the instructions, determined based on resolving the conflict, to DU 103. For example, CRF 101 may provide the selected set of instructions (in instances where one set of instructions was selected and one was rejected) or the combined set of instructions to DU 103. DU 103 may implement the instructions, which may include modifying one or more configuration parameters of an associated RU 109 and/or other suitable actions.

Figure 10:
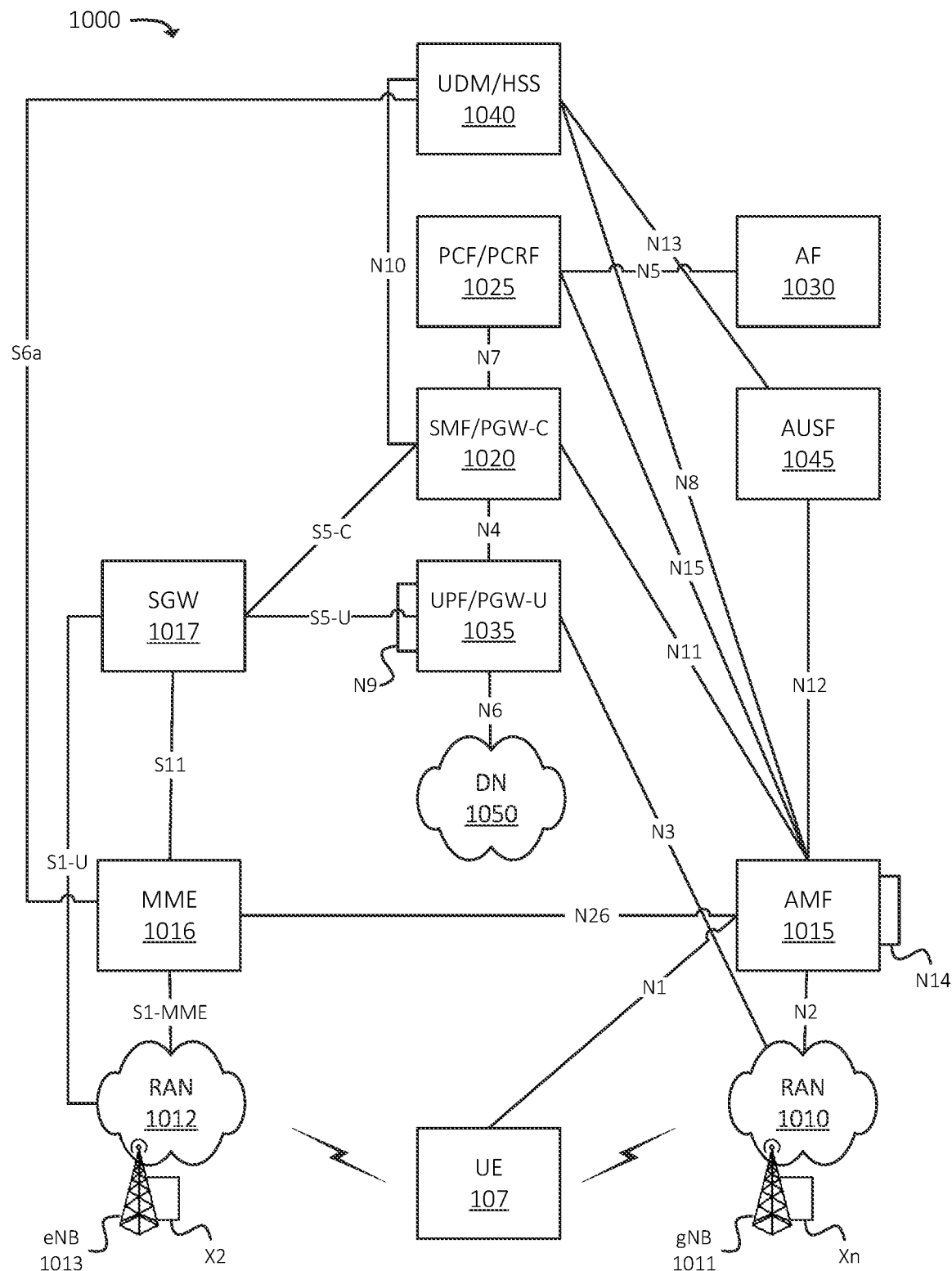
FIG. 10 illustrates an example environment in which one or more embodiments, described herein, may be implemented.

FIG. 10 illustrates an example environment 1000, in which one or more embodiments may be implemented. In some embodiments, environment 1000 may correspond to a Fifth Generation ("5G") network, and/or may include elements of a 5G network. In some embodiments, environment 1000 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 1000 may represent or may include a 5G core ("5GC"). As shown, environment 1000 may include UE 107, RAN 1010 (which may include one or more Next Generation Node Bs ("gNBs") 1011), RAN 1012 (which may include one or more evolved Node Bs ("eNBs") 1013), and various network functions such as Access and Mobility Management Function ("AMF") 1015, Mobility Management Entity ("MME") 1016, Serving Gateway ("SGW") 1017, Session Management Function ("SMF")/Packet Data Network ("PDN") Gateway ("PGW")-Control plane function ("PGW-C") 1020, Policy Control Function ("PCF")/Policy Charging and Rules Function ("PCRF") 1025, Application Function ("AF") 1030, User Plane Function ("UPF")/PGW-User plane function ("PGW-U") 1035, Unified Data Management ("UDM")/Home Subscriber Server ("HSS") 1040, and Authentication Server Function ("AUSF") 1045. Environment 1000 may also include one or more networks, such as Data Network ("DN") 1050. Environment 1000 may include one or more additional devices or systems communicatively coupled to one or more networks (e.g., DN 1050), such as CRF 101.

The example shown in FIG. 10 illustrates one instance of each network component or function (e.g., one instance of SMF/PGW-C 1020, PCF/PCRF 1025, UPF/PGW-U 1035, UDM/HSS 1040, and/or AUSF 1045). In practice, environment 1000 may include multiple instances of such components or functions. For example, in some embodiments, environment 1000 may include multiple "slices" of a core network, where each slice includes a discrete and/or logical set of network functions (e.g., one slice may include a first instance of SMF/PGW-C 1020, PCF/PCRF 1025, UPF/PGW-U 1035, UDM/HSS 1040, and/or AUSF 1045, while another slice may include a second instance of SMF/PGW-C 1020, PCF/PCRF 1025, UPF/PGW-U 1035, UDM/HSS 1040, and/or AUSF 1045). The different slices may provide differentiated levels of service, such as service in accordance with different Quality of Service ("QoS") parameters.

The quantity of devices and/or networks, illustrated in FIG. 10, is provided for explanatory purposes only. In practice, environment 1000 may include additional devices and/or networks, fewer devices and/or networks, different devices and/or networks, or differently arranged devices and/or networks than illustrated in FIG. 10. For example, while not shown, environment 1000 may include devices that facilitate or enable communication between various components shown in environment 1000, such as routers, modems, gateways, switches, hubs, etc. Alternatively, or additionally, one or more of the devices of environment 1000 may perform one or more network functions described as being performed by another one or more of the devices of environment 1000. Devices of environment 1000 may interconnect with each other and/or other devices via wired connections, wireless connections, or a combination of wired and wireless connections. In some implementations, one or more devices of environment 1000 may be physically integrated in, and/or may be physically attached to, one or more other devices of environment 1000.

UE 107 may include a computation and communication device, such as a wireless mobile communication device that is capable of communicating with RAN 1010, RAN 1012, and/or DN 1050. UE 107 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 107 may send traffic to and/or receive traffic (e.g., user plane traffic) from DN 1050 via RAN 1010, RAN 1012, and/or UPF/PGW-U 1035.

RAN 1010 may be, or may include, a 5G RAN that includes one or more base stations (e.g., one or more gNBs 1011), via which UE 107 may communicate with one or more other elements of environment 1000. UE 107 may communicate with RAN 1010 via an air interface (e.g., as provided by gNB 1011). For instance, RAN 1010 may receive traffic (e.g., voice call traffic, data traffic, messaging traffic, signaling traffic, etc.) from UE 107 via the air interface, and may communicate the traffic to UPF/PGW-U 1035, and/or one or more other devices or networks. Similarly, RAN 1010 may receive traffic intended for UE 107 (e.g., from UPF/PGW-U 1035, AMF 1015, and/or one or more other devices or networks) and may communicate the traffic to UE 107 via the air interface.

RAN 1012 may be, or may include, a LTE RAN that includes one or more base stations (e.g., one or more eNBs 1013), via which UE 107 may communicate with one or more other elements of environment 1000. UE 107 may communicate with RAN 1012 via an air interface (e.g., as provided by eNB 1013). For instance, RAN 1012 may receive traffic (e.g., voice call traffic, data traffic, messaging traffic, signaling traffic, etc.) from UE 107 via the air interface, and may communicate the traffic to UPF/PGW-U 1035, and/or one or more other devices or networks. Similarly, RAN 1012 may receive traffic intended for UE 107 (e.g., from UPF/PGW-U 1035, SGW 1017, and/or one or more other devices or networks) and may communicate the traffic to UE 107 via the air interface.

AMF 1015 may include one or more devices, systems, Virtualized Network Functions ("VNFs"), Cloud-Native Network Functions ("CNFs"), etc., that perform operations to register UE 107 with the 5G network, to establish bearer channels associated with a session with UE 107, to hand off UE 107 from the 5G network to another network, to hand off UE 107 from the other network to the 5G network, manage mobility of UE 107 between RANs 1010 and/or gNBs 1011, and/or to perform other operations. In some embodiments, the 5G network may include multiple AMFs 1015, which communicate with each other via the N14 interface (denoted in FIG. 10 by the line marked "N14" originating and terminating at AMF 1015).

MME 1016 may include one or more devices, systems, VNFs, CNFs, etc., that perform operations to register UE 107 with the EPC, to establish bearer channels associated with a session with UE 107, to hand off UE 107 from the EPC to another network, to hand off UE 107 from another network to the EPC, manage mobility of UE 107 between RANs 1012 and/or eNBs 1013, and/or to perform other operations.

SGW 1017 may include one or more devices, systems, VNFs, CNFs, etc., that aggregate traffic received from one or more eNBs 1013 and send the aggregated traffic to an external network or device via UPF/PGW-U 1035. Additionally, SGW 1017 may aggregate traffic received from one or more UPF/PGW-Us 1035 and may send the aggregated traffic to one or more eNBs 1013. SGW 1017 may operate as an anchor for the user plane during inter-eNB handovers and as an anchor for mobility between different telecommunication networks or RANs (e.g., RANs 1010 and 1012).

SMF/PGW-C 1020 may include one or more devices, systems, VNFs, CNFs, etc., that gather, process, store, and/or provide information in a manner described herein. SMF/PGW-C 1020 may, for example, facilitate the establishment of communication sessions on behalf of UE 107. In some embodiments, the establishment of communications sessions may be performed in accordance with one or more policies provided by PCF/PCRF 1025.

PCF/PCRF 1025 may include one or more devices, systems, VNFs, CNFs, etc., that aggregate information to and from the 5G network and/or other sources. PCF/PCRF 1025 may receive information regarding policies and/or subscriptions from one or more sources, such as subscriber databases and/or from one or more users (such as, for example, an administrator associated with PCF/PCRF 1025).

AF 1030 may include one or more devices, systems, VNFs, CNFs, etc., that receive, store, and/or provide information that may be used in determining parameters (e.g., quality of service parameters, charging parameters, or the like) for certain applications.

UPF/PGW-U 1035 may include one or more devices, systems, VNFs, CNFs, etc., that receive, store, and/or provide data (e.g., user plane data). For example, UPF/PGW-U 1035 may receive user plane data (e.g., voice call traffic, data traffic, etc.), destined for UE 107, from DN 1050, and may forward the user plane data toward UE 107 (e.g., via RAN 1010, SMF/PGW-C 1020, and/or one or more other devices). In some embodiments, multiple UPFs 1035 may be deployed (e.g., in different geographical locations), and the delivery of content to UE 107 may be coordinated via the N9 interface (e.g., as denoted in FIG. 10 by the line marked "N9" originating and terminating at UPF/PGW-U 1035). Similarly, UPF/PGW-U 1035 may receive traffic from UE 107 (e.g., via RAN 1010, SMF/PGW-C 1020, and/or one or more other devices), and may forward the traffic toward DN 1050. In some embodiments, UPF/PGW-U 1035 may communicate (e.g., via the N4 interface) with SMF/PGW-C 1020, regarding user plane data processed by UPF/PGW-U 1035.

UDM/HSS 1040 and AUSF 1045 may include one or more devices, systems, VNFs, CNFs, etc., that manage, update, and/or store, in one or more memory devices associated with AUSF 1045 and/or UDM/HSS 1040, profile information associated with a subscriber. AUSF 1045 and/or UDM/HSS 1040 may perform authentication, authorization, and/or accounting operations associated with the subscriber and/or a communication session with UE 107.

DN 1050 may include one or more wired and/or wireless networks. For example, DN 1050 may include an Internet Protocol ("IP")-based PDN, a wide area network ("WAN") such as the Internet, a private enterprise network, and/or one or more other networks. UE 107 may communicate, through DN 1050, with data servers, other UEs 107, and/or to other servers or applications that are coupled to DN 1050. DN 1050 may be connected to one or more other networks, such as a public switched telephone network ("PSTN"), a public land mobile network ("PLMN"), and/or another network. DN 1050 may be connected to one or more devices, such as content providers, applications, web servers, and/or other devices, with which UE 107 may communicate.

Figure 11:
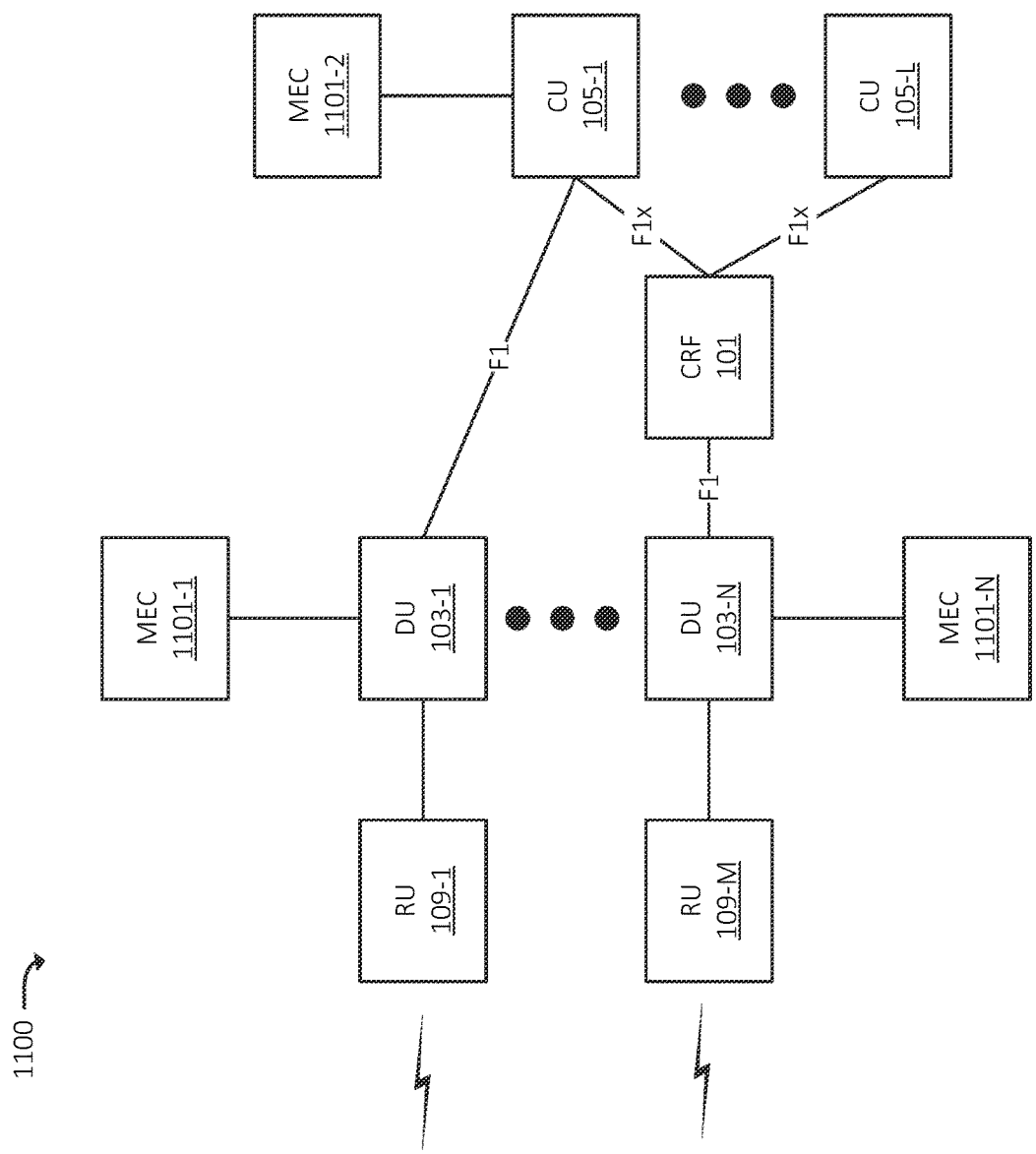
FIG. 11 illustrates an example arrangement of a radio access network ("RAN"), in accordance with some embodiments.

FIG. 11 illustrates an example RAN split environment 1100, which may be included in and/or implemented by one or more RANs (e.g., RAN 1010, RAN 1012, or some other RAN). In some embodiments, RAN split environment 1100 may correspond to a particular gNB 1011 of a 5G RAN (e.g., RAN 1010), and/or a portion thereof. In some embodiments, RAN split environment 1100 may correspond to multiple gNBs 1011, and/or portions thereof. In some embodiments, RAN split environment 1100 may correspond to one or more other types of base stations of one or more other types of RANs. As shown, RAN split environment 1100 may include one or more CUs 105-1 through 105-L, one or more DUs 103-1 through 103-N, and one or more RUs 109-1 through 109-M.

CU 105 may communicate with a core of a wireless network (e.g., may communicate with one or more of the devices or systems described above with respect to FIG. 10, such as AMF 1015 and/or UPF/PGW-U 1035). In the uplink direction (e.g., for traffic from UEs 107 to a core network), CU 105 may aggregate traffic from DUs 103, and forward the aggregated traffic to the core network. In some embodiments, CU 105 may receive traffic according to a given protocol (e.g., RLC) from DUs 103, and may perform higher-layer processing (e.g., may aggregate/process RLC packets and generate PDCP packets based on the RLC packets) on the traffic received from DUs 103.

In accordance with some embodiments, CU 105 may receive downlink traffic (e.g., traffic from the core network) for a particular UE 107, and may determine which DU(s) 103 should receive the downlink traffic. DU 103 may include one or more devices that transmit traffic between a core network (e.g., via CU 105) and UE 107 (e.g., via a respective RU 109). DU 103 may, for example, receive traffic from RU 109 at a first layer (e.g., physical ("PHY") layer traffic, or lower PHY layer traffic), and may process/aggregate the traffic to a second layer (e.g., upper PHY and/or RLC). DU 103 may receive traffic from CU 105 at the second layer, may process the traffic to the first layer, and provide the processed traffic to a respective RU 109 for transmission to UE 107.

In some embodiments, a particular CU 105 may be communicatively coupled to multiple DUs 103, and/or to one or more instances of CRF 101, which may provide an enhanced midhaul interface between such CU 105 and one or more DUs 103, as discussed above. Further, CRF 101 may be communicatively coupled to one or more DUs 103 (e.g., via an F1 interface or other suitable midhaul interface). Further still, CRF 101 may be communicatively coupled to multiple CUs 105. As discussed above, CRF 101 may provide for the sharing of hardware radio resources (e.g., DU 103 and/or RU 109) between multiple CUs 105 and/or associated core networks 111.

RU 109 may include hardware circuitry (e.g., one or more RF transceivers, antennas, radios, and/or other suitable hardware) to communicate wirelessly (e.g., via an RF interface) with one or more UEs 107, one or more other DUs 103 (e.g., via RUs 109 associated with DUs 103), and/or any other suitable type of device. In the uplink direction, RU 109 may receive traffic from UE 107 and/or another DU 103 via the RF interface and may provide the traffic to DU 103. In the downlink direction, RU 109 may receive traffic from DU 103, and may provide the traffic to UE 107 and/or another DU 103.

One or more elements of RAN split environment 1100 may, in some embodiments, be communicatively coupled to one or more Multi-Access/Mobile Edge Computing ("MEC") devices, referred to sometimes herein simply as "MECs" 1101. For example, DU 103-1 may be communicatively coupled to MEC 1101-1, DU 103-N may be communicatively coupled to MEC 1101-N, CU 105 may be communicatively coupled to MEC 1101-2, and so on. MECs 1101 may include hardware resources (e.g., configurable or provisionable hardware resources) that may be configured to provide services and/or otherwise process traffic to and/or from UE 107, via a respective RU 109.

For example, DU 103-1 may route some traffic, from UE 107, to MEC 1101-1 instead of to a core network 111 via CU 105-1. MEC 1101-1 may process the traffic, perform one or more computations based on the received traffic, and may provide traffic to UE 107 via DU 103-1 and RU 109-1. In some embodiments, MEC 1101 may include, and/or may implement, some or all of the functionality described above with respect to CRF 101, AF 1030, UPF 1035, and/or one or more other devices, systems, VNFs, CNFs, etc. In this manner, ultra-low latency services may be provided to UE 107, as traffic does not need to traverse DU 103, CU 105, links between DU 103 and CU 105, and/or an intervening backhaul network between RAN split environment 1100 and the core network.

Figure 12:
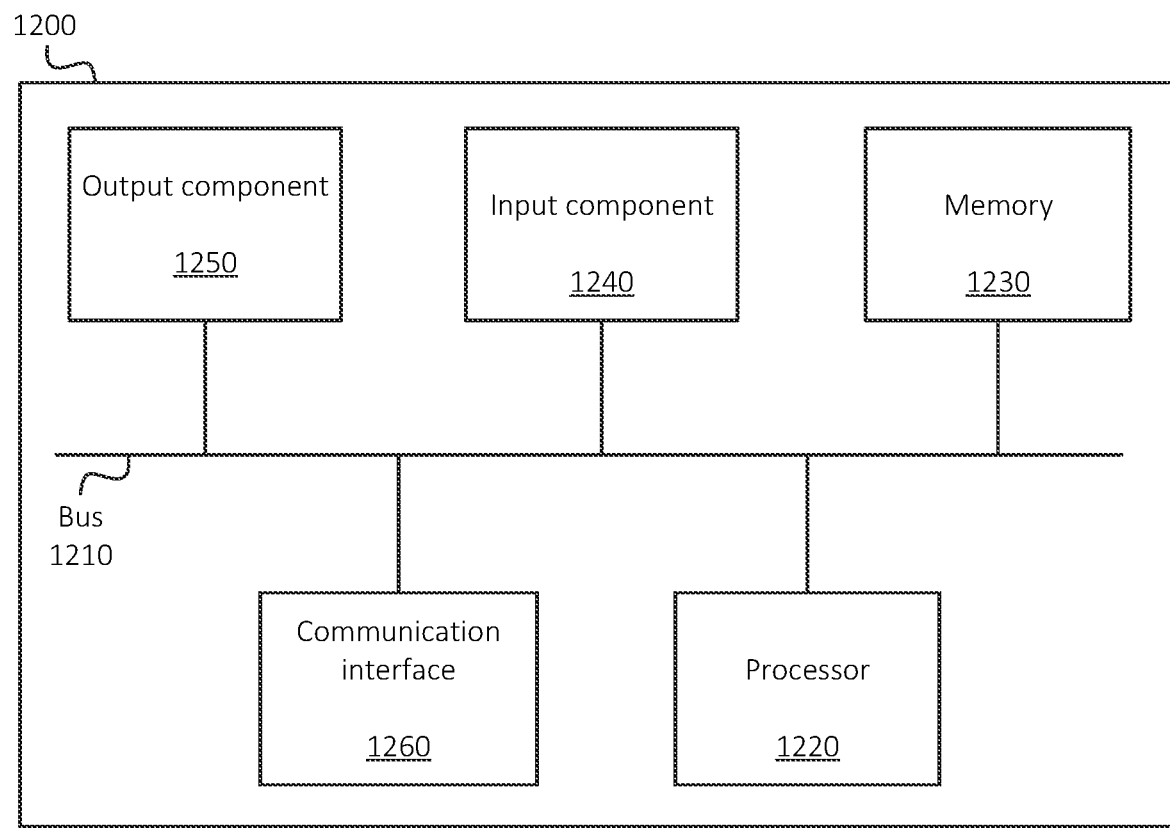
FIG. 12 illustrates example components of one or more devices, in accordance with one or more embodiments described herein.

FIG. 12 illustrates example components of device 1200. One or more of the devices described above may include one or more devices 1200. Device 1200 may include bus 1210, processor 1220, memory 1230, input component 1240, output component 1250, and communication interface 1260. In another implementation, device 1200 may include additional, fewer, different, or differently arranged components.

Bus 1210 may include one or more communication paths that permit communication among the components of device 1200. Processor 1220 may include a processor, microprocessor, or processing logic that may interpret and execute instructions. In some embodiments, processor 1220 may be or may include one or more hardware processors. Memory 1230 may include any type of dynamic storage device that may store information and instructions for execution by processor 1220, and/or any type of non-volatile storage device that may store information for use by processor 1220.

Input component 1240 may include a mechanism that permits an operator to input information to device 1200 and/or other receives or detects input from a source external to 1240, such as a touchpad, a touchscreen, a keyboard, a keypad, a button, a switch, a microphone or other audio input component, etc. In some embodiments, input component 1240 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor.

Output component 1250 may include a mechanism that outputs information to the operator, such as a display, a speaker, one or more light emitting diodes ("LEDs"), etc.

Communication interface 1260 may include any transceiver-like mechanism that enables device 1200 to communicate with other devices and/or systems. For example, communication interface 1260 may include an Ethernet interface, an optical interface, a coaxial interface, or the like. Communication interface 1260 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1200 may include more than one communication interface 1260. For instance, device 1200 may include an optical interface and an Ethernet interface.

Device 1200 may perform certain operations relating to one or more processes described above. Device 1200 may perform these operations in response to processor 1220 executing software instructions stored in a computer-readable medium, such as memory 1230. A computer-readable medium may be defined as a non-transitory memory device. A memory device may include space within a single physical memory device or spread across multiple physical memory devices. The software instructions may be read into memory 1230 from another computer-readable medium or from another device. The software instructions stored in memory 1230 may cause processor 1220 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-9), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
      receive priority information associated with a first Central Unit ("CU") and a second CU;
      receive a first set of configuration instructions from the first CU, wherein the first set of configuration instructions include configuration instructions for a particular Distributed Unit ("DU");
      receive a second set of configuration instructions from the second CU, wherein the second set of configuration instructions include configuration instructions for the particular DU;
      identify a conflict between the first and second sets of configuration instructions based on the first and second sets of configuration instructions being associated with the same particular DU;
      resolve the conflict based on the priority information associated with the first CU and the second CU, wherein resolving the conflict includes one of:
         selecting the first set of configuration instructions based on respective priorities of the first and second CUs, or
         combining the first and second sets of configuration instructions to generate a third set of configuration instructions; and
      configure the particular DU to implement the selected first set of configuration instructions or the generated third set of configuration instructions.

2. The device of claim 1, wherein selecting the first set of configuration instructions includes notifying the second CU that the second set of configuration instructions have not been implemented.

3. The device of claim 1, wherein the set of configuration instructions include configuration instructions for at least one of:
   the particular DU, or
   a radio unit ("RU") that is communicatively coupled to the particular DU.

4. The device of claim 3, wherein the configuration instructions include beamforming instructions for the RU.

5. The device of claim 1, wherein the first CU is associated with a first core network, and wherein the second CU is associated with a second core network.

6. The device of claim 5, wherein the first core network is associated with a first identifier, wherein the second core network is associated with a second identifier, and wherein the one or more processors are further configured to:
   receive traffic, from the particular DU;
   identify that the traffic is associated with the first identifier; and
   provide, based on identifying that the traffic is associated with the first identifier, the traffic to the first CU without providing the traffic to the second CU.

7. The device of claim 1, wherein resolving the conflict includes identifying at least one weight associated with at least one of the first CU or the second CU, wherein combining the first and second sets of configuration instructions includes applying the weight to one or more values included in at least one of the first set of configuration instructions or the second set of configuration instructions.

8. A non-transitory computer-readable medium, storing a plurality of processor-executable instructions to:
   receive priority information associated with a first Central Unit ("CU") and a second CU;
   receive a first set of configuration instructions from the first CU, wherein the first set of configuration instructions include configuration instructions for a particular Distributed Unit ("DU");
   receive a second set of configuration instructions from the second CU, wherein the second set of configuration instructions include configuration instructions for the particular DU;
   identify a conflict between the first and second sets of configuration instructions based on the first and second sets of configuration instructions being associated with the same particular DU;
   resolve the conflict based on the priority information associated with the first CU and the second CU, wherein resolving the conflict includes one of:
      selecting the first set of configuration instructions based on respective priorities of the first and second CUs, or combining the first and second sets of configuration instructions to generate a third set of configuration instructions; and configure the particular DU to implement the selected first set of configuration instructions or the generated third set of configuration instructions.

9. The non-transitory computer-readable medium of claim 8, wherein selecting the first set of configuration instructions includes notifying the second CU that the second set of configuration instructions have not been implemented.

10. The non-transitory computer-readable medium of claim 8, wherein the set of configuration instructions include configuration instructions for at least one of:
the particular DU, or
a radio unit ("RU") that is communicatively coupled to the particular DU.

11. The non-transitory computer-readable medium of claim 10, wherein the configuration instructions include beamforming instructions for the RU.

12. The non-transitory computer-readable medium of claim 8, wherein the first CU is associated with a first core network, and wherein the second CU is associated with a second core network.

13. The non-transitory computer-readable medium of claim 12, wherein the first core network is associated with a first identifier, wherein the second core network is associated with a second identifier, and wherein the plurality of processor-executable instructions further include processor-executable instructions to:
receive traffic, from the particular DU;
identify that the traffic is associated with the first identifier; and
provide, based on identifying that the traffic is associated with the first identifier, the traffic to the first CU without providing the traffic to the second CU.

14. The non-transitory computer-readable medium of claim 8, wherein resolving the conflict includes identifying at least one weight associated with at least one of the first CU or the second CU, wherein combining the first and second sets of configuration instructions includes applying the weight to one or more values included in at least one of the first set of configuration instructions or the second set of configuration instructions.

15. A method, comprising:
receiving priority information associated with a first Central Unit ("CU") and a second CU;
receiving a first set of configuration instructions from the first CU, wherein the first set of configuration instructions include configuration instructions for a particular Distributed Unit "DU");
receiving a second set of configuration instructions from the second CU, wherein the second set of configuration instructions include configuration instructions for the particular DU;
identifying a conflict between the first and second sets of configuration instructions based on the first and second sets of configuration instructions being associated with the same particular DU;
resolving the conflict based on the priority information associated with the first CU and the second CU, wherein resolving the conflict includes one of:
selecting the first set of configuration instructions based on respective priorities of the first and second CUs, or
combining the first and second sets of configuration instructions to generate a third set of configuration instructions; and
configuring the particular DU to implement the selected first set of configuration instructions or the generated third set of configuration instructions.

16. The method of claim 15, wherein selecting the first set of configuration instructions includes notifying the second CU that the second set of configuration instructions have not been implemented.

17. The method of claim 15, wherein the set of configuration instructions include beamforming instructions for a radio unit ("RU") that is communicatively coupled to the particular DU.

18. The method of claim 15, wherein the first CU is associated with a first core network, and wherein the second CU is associated with a second core network.

19. The method of claim 18, wherein the first core network is associated with a first identifier, wherein the second core network is associated with a second identifier, and wherein the method further comprises:
receiving traffic, from the particular DU;
identifying that the traffic is associated with the first identifier; and
providing, based on identifying that the traffic is associated with the first identifier, the traffic to the first CU without providing the traffic to the second CU.

20. The method of claim 15, wherein resolving the conflict includes identifying at least one weight associated with at least one of the first CU or the second CU, wherein combining the first and second sets of configuration instructions includes applying the weight to one or more values included in at least one of the first set of configuration instructions or the second set of configuration instructions.

* * * * *